E. KATZINGER.
DIES FOR MAKING PANS.
APPLICATION FILED OCT. 23, 1908.
972,113.
Patented Oct. 4, 1910.
3 SHEETS—SHEET 1.
Fig. 1.
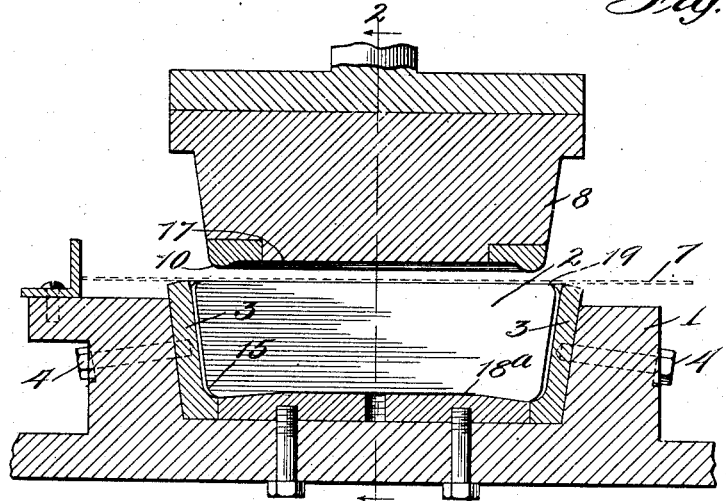
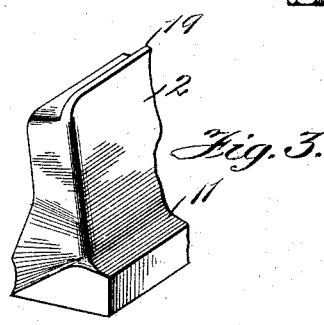
Fig. 3.
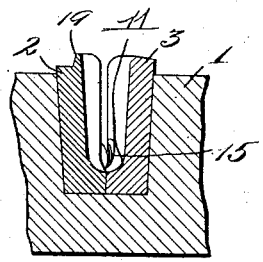
Fig. 4.
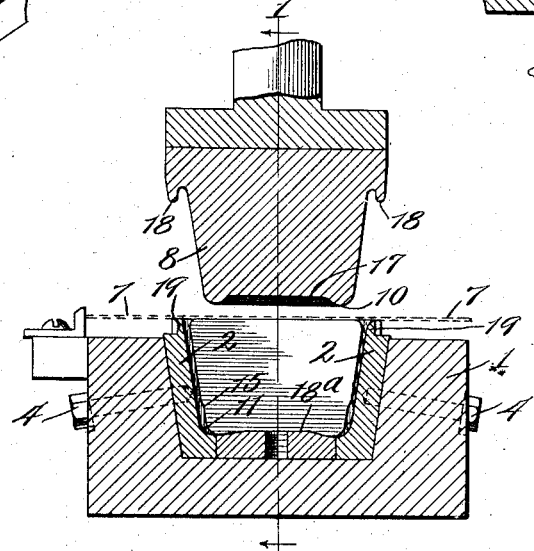
Fig. 2.
Witnesses:
Inventor:
Edward Katzinger
By Brown Hopkins E. KATZINGER.
DIES FOR MAKING PANS.
APPLICATION FILED OCT. 23, 1908.
No. 972,113.
Patented Oct. 4, 1910.
3 SHEETS—SHEET 2.
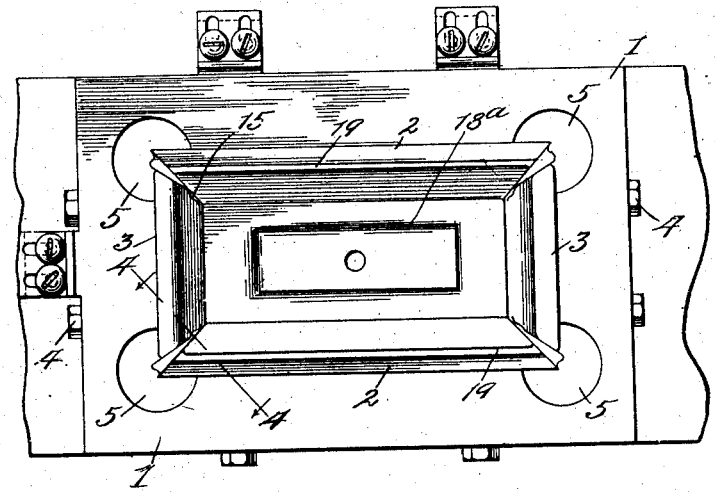
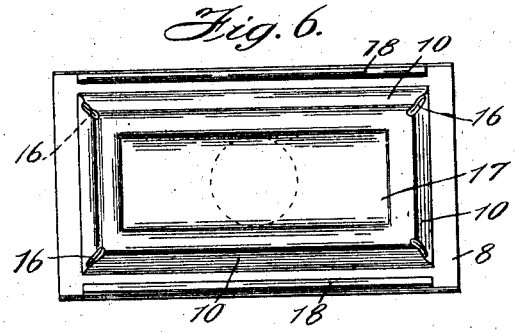
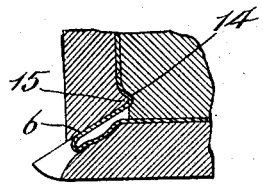
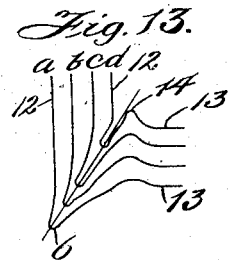

E. KATZINGER.
DIES FOR MAKING PANS.
APPLICATION FILED OCT. 23, 1908.
972,113.
Patented Oct. 4, 1910.
3 SHEETS—SHEET 3.
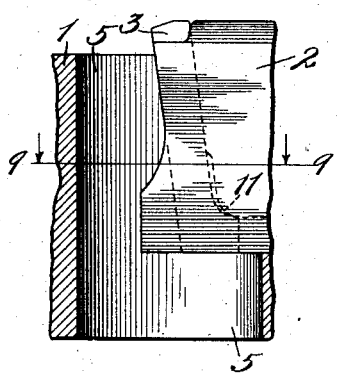
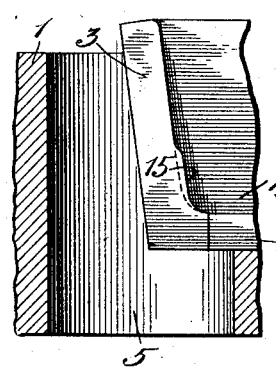
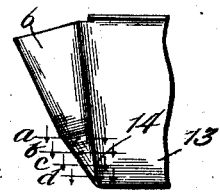
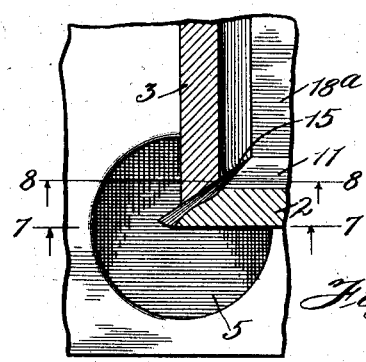
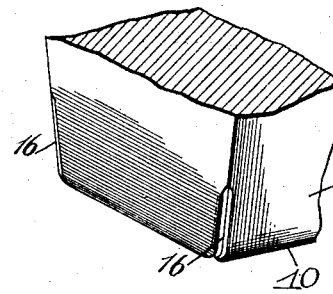
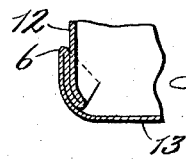
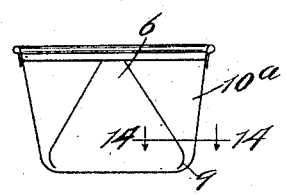
Witnesses:
Inventor:
Edward Katzinger
By Brown & Hopkins
Attys

UNITED STATES PATENT OFFICE.

EDWARD KATZINGER, OF CHICAGO, ILLINOIS.

DIES FOR MAKING PANS.

972,113.  Specification of Letters Patent.  Patented Oct. 4, 1910.

Application filed October 23, 1908. Serial No. 459,140.

*To all whom it may concern:*

Be it known that I, EDWARD KATZINGER, a citizen of the United States, residing at Chicago, in the county of Cook and State of Illinois, have invented certain new and useful Improvements in Dies for Making Pans, of which the following is a full, clear, and exact specification.

My invention relates to dies for forming pans, such as bread pans and the like, and it has for its primary object to make a die capable of producing a pan with convex corners and rounded edges where the walls conjoin and the bottom joins with the walls, by the folding method and without materially drawing the metal, whereby a very thin or low grade of stock may be effectually employed.

Another object of the invention is to stretch the bottom of the pan when being produced, whereby the undulations usually present in thin sheet metal will be eliminated and the bottom of the pan made perfectly flat.

With a view to the attainment of these ends and certain other objects that will hereinafter appear, the invention consists in the features of novelty which will now be described with reference to the accompanying drawings and more particularly pointed out in the claims.

In the said drawings—Figure 1 is a vertical longitudinal sectional view of both dies taken on the line 1—1, Fig. 2. Fig. 2 is a transverse section thereof on the line 2—2, Fig. 1. Fig. 3 is an enlarged detail perspective view of the corner of one of the walls of the female die. Fig. 4 is a detail cross section of both corners thereof taken approximately on the line 4—4, Fig. 5. Fig. 5 is a plan view of the female die. Fig. 6 is a bottom view of the male die. Fig. 7 is a vertical detail section taken on the line 7—7, Fig. 9. Fig. 8 is a similar section on the line 8—8, Fig. 9. Fig. 9 is a plan section on the line 9—9, Fig. 7. Fig. 10 is a perspective view of one end of the male die. Fig. 11 is a plan section of one corner, showing the dies together and also showing the metal between them, the section being taken approximately on the same plane as Fig. 9. Fig. 12 is a detail side elevation of one end of the blank after it leaves the dies. Fig. 12ª is an enlarged detail view of one corner of the pan. Fig. 13 is a diagram of the various profiles or outlines that would be produced by cutting the pan or blank shown in Fig. 12 on the various section lines $a, b, c, d,$ in Fig. 12. Fig. 14 is a plan section of one corner of the pan taken on the line 14—14, Fig. 15, on an enlarged scale; and Fig. 15 is an end elevation of the complete pan.

1 is a body or die stock which is recessed for receiving a number of plates 2, 3 constituting the sides and ends of the female die and upon which plates are formed the features thereof, this method of construction being adapted as being more convenient than to form the features directly in the solid block 1. The various plates 2, 3 are secured to the block 1 by bolts or screws 4 and at their corners the block is formed with recesses 5 for receiving the flaps 6 produced at the corners of the blank 7 when the latter is forced downwardly by the male die 8, the plates 2, 3 being arranged at a slight distance apart at their meeting ends to allow these flaps 6 to project through, as shown more clearly in Fig. 11. After the flap 6 is produced it is folded over the end or side wall of the pan in the manner shown in Fig. 15, by any suitable means not necessary to be described in this specification, after the blank has been removed from these dies and the act of thus folding it after it has received the peculiar formation which is imparted to it by these dies produces the convex corners 9 and rounded vertical corners 10ª where the side walls of the pan conjoin, the corners of the pan along the lines of conjunction between the bottom and sides or walls are made rounding or cylindrical by the rounded or cylindrical edges 10 of the male die and the rounded corners 11 of the female die, see Figs. 2 and 3. It is quite obvious, however, that the mere act of producing the flap 6 and then smoothing the same against the end of the pan to the position shown in Fig. 15 would not necessarily result in the convex corner 9, but on the contrary would inevitably result in a sharp point or corner where the bottom and upright edges of the pan converge, were it not for the special features of the dies which will now be explained.

The dies are so formed contiguous to their lower corners as to produce a formation in the blank 7 that would approximate the outlines or profiles shown in Fig. 13 if the blank were cut or sectioned across the corners on the section lines $a, b, c, d,$ and from which Fig. 13 it will be seen that the flap 6 where it conjoins with one wall 12 of the pan or blank forms an obtuse angle which grows wider as it nears the top or upper edge of the wall, while the other side of the flap where it conjoins with the wall 13 of the pan or blank forms a very sharp or acute angle with the wall 13, produced by rounding the wall 13 inwardly or kinking it, as shown at 14. This kink 14 of the wall 13 and flap 6 is not carried in a straight line along the upright edge or corner of the pan but is turned inwardly under the corner as indicated by the line 14$^a$, Fig. 12$^a$, so that when the flap 6 is folded against the end wall of the pan it will bend along the line 14$^a$ in a direction curving under the pan and conforming to the convex corner to be produced, while at the same time bending at the kink 14 and following the rounded or cylindrical part of the bend in the wall 13 produced by producing said kink. These features, however, of the pan itself constitute the subject-matter of the claims of a co-pending application and need not be further explained in detail in this specification which concerns itself solely with the means of producing such features and the accomplishment of the other objects before mentioned. The sharp kink or crease 14 is produced by a lip or ridge 15 formed in the female die at each end of one of the end plates 3 along its upright edge contiguous to the space between the plates 2, 3, and the recess or groove 16 of complementary or corresponding form in each of the upright corners or edges of the male die. When the metal is pressed between the dies, the lip 15 forces the metal inwardly into the groove 16 and produces the sharp bend or crease 14, which, as before explained, extends around the lower side of the corner and preferably to a point contiguous to that at which the flat bottom conjoins with the rounded portion of the pan. This kink or crease 14 might be carried entirely to the upper end of the flap 6, but since its object is to start the bend or fold along the proper line around the convex corner, it is unnecessary to extend it any material distance into that part of the bend where the flap folds or bends along a straight line. With the metal thus sharply creased at 14 and along the line 14$^a$ it will be seen that when the flap 6 is folded toward the wall 13 it will be compelled to fold or bend in conformity with the contour of the convex surface or corner to be produced, thus resulting in a convex corner, without subjecting the metal to any material degree of drawing.

Thin sheet metal in the commercial state possesses undulations or waves and when these remain in the bottom of the pan they cause the same to be uneven and prevent it from resting flat upon the bottom of the oven, resulting in uneven baking of the loaf. In order that these waves or undulations may be eliminated and the bottom of the pan made perfectly flat, the dies are provided with means for stretching the bottom portion, consisting simply of a depression 17 in the bottom of the male die and a corresponding elevation 18$^a$ in the female die, and which two features serve to press the bottom of the pan upwardly or inwardly slightly beyond the plane which it is desired it shall assume when finished, and thereby stretching the metal so that when it is released it will spring back to such plane in a perfectly flat condition. As the dies come together the sheet 7 is first depressed to a point near the bottom of the lower die, and before reaching the bottom the edges of the sheet are engaged by lips or flanges 18 on the male die and 19 on the female die, which serve to turn down the edges of the sheet for producing the flange around the edge of the pan which holds the wire frame, as well understood, and by thus providing suitable means for gripping the edges of the sheet while the blank is being pressed and before the relative movement between the dies has ceased, it is held with sufficient rigidity to enable the dies to stretch the bottom as before described.

Having thus described my invention, what I claim as new therein and desire to secure by Letters Patent, is:

1. The combination of a female die having passages at the corners thereof for the protrusion of the metal to be formed, inwardly projecting lips extending upwardly along one edge of each of said passages, and a male die having grooved or recessed corners for receiving said lips.

2. The combination of a female die having passages at the corners thereof for the protrusion of the metal to be formed, the lower inner corners of said die being rounded or curved where the walls conjoin with the bottom and the edges of said passages having inwardly projecting lips also curved at their lower ends to conform to the curvature of said corners, and a male die having its inner edges or corners where the sides and bottom conjoin, curved to conform to the said curved corners of the female die, and the upright corners of the male die being also provided with grooves complementary in shape to said lips.

3. The combination of male and female dies, one of said dies having openings at the corners thereof for the reception of portions of the stamped sheet, said die being also provided with a projecting lip along one edge of each opening, and the other of said dies being provided with recessed corners for receiving said lips.

4. The combination of male and female dies, one of said dies being provided with openings at the corners thereof for the reception of portions of the stamped sheet and with a projecting lip along one edge of each opening, the other of said dies being provided with recessed corners for receiving said lips, and said dies being further provided with extended clamping portions for clamping a pan prior to the end of the stamping operation.

5. The combination of a female die having passages at the corners thereof for the protrusion of the metal to be formed and being provided with a flat elevation in the bottom thereof extending throughout substantially the entire bottom, the lower inner corners of said die being rounded or curved where the walls conjoin with the bottom and the edges of said passages having inwardly projecting lips also curved at their lower ends to conform to the curvature of said corners, a male die having its inner edges or corners where the sides and bottoms adjoin curved to conform to the said curved corners of the female die, the upright corners of the male die being provided with grooves complementary in shape to said lips, said male die being also provided with a depression adapted to receive said elevation for stretching the metal.

6. The combination of male and female dies, one of said dies being provided with openings at the corners thereof for the reception of portions of the stamped sheet and with a projecting lip along one edge of each opening, the other of said dies being provided with recessed corners for receiving said lips, and said dies being further provided with extended sides adapted to overlap and slidably clamp the edges of the pan prior to the end of the stamping operation.

In testimony whereof I have signed my name to this specification, in the presence of two subscribing witnesses, on this 20th day of October, A. D. 1908.

EDWARD KATZINGER.

Witnesses:
J. H. JOCHUM, Jr.,
C. H. SEEM.